US005620194A

United States Patent [19]
Keeler et al.

[11] Patent Number: 5,620,194
[45] Date of Patent: Apr. 15, 1997

[54] SELF-STEERING SUSPENSION LOCKOUT MECHANISM

[75] Inventors: Michael J. Keeler, Canton; Michael J. Gottschalk, New Philadelphia, both of Ohio

[73] Assignee: The Boler Company, Itasca, Ill.

[21] Appl. No.: 477,587

[22] Filed: Jun. 7, 1995

[51] Int. Cl.$^6$ ................................................. B60D 1/06
[52] U.S. Cl. ........................................ 280/81.6; 280/661
[58] Field of Search ................................. 280/81.6, 661, 280/96.1

[56] References Cited

U.S. PATENT DOCUMENTS

| | | |
|---|---|---|
| 2,847,228 | 8/1958 | Hall . |
| 2,890,063 | 6/1959 | Stover . |
| 3,204,977 | 9/1965 | Eisenhauer et al. . |
| 3,354,982 | 11/1967 | Schramm . |
| 3,381,974 | 5/1968 | Carter, Jr. et al. . |
| 3,716,249 | 2/1973 | Schaeff . |
| 3,880,439 | 4/1975 | Wolter . |
| 4,076,264 | 2/1978 | Chatterley . |
| 4,084,833 | 4/1978 | Mohrbacker et al. . |
| 4,314,709 | 2/1982 | Silbernagel . |
| 4,417,739 | 11/1983 | Whitaker . |
| 4,667,974 | 5/1987 | Giese . |
| 4,770,430 | 9/1988 | Lange . |
| 4,824,135 | 4/1989 | McGregor . |
| 4,881,747 | 11/1989 | Raidel . |
| 4,893,825 | 1/1990 | Janson ..................... 280/81.6 |
| 4,903,976 | 2/1990 | Baillie . |
| 5,015,004 | 5/1991 | Mitchell ................... 280/81.6 |
| 5,018,756 | 5/1991 | Mitchell ................... 280/81.6 |
| 5,207,443 | 5/1993 | Mitchell . |
| 5,244,226 | 9/1993 | Bergh . |
| 5,269,546 | 12/1993 | Pollock et al. . |
| 5,403,031 | 4/1995 | Gottschalk et al. . |
| 5,526,895 | 6/1996 | Shin ......................... 280/81.6 |

FOREIGN PATENT DOCUMENTS

| | | | |
|---|---|---|---|
| 3833181 | 4/1990 | Germany ................. 280/81.6 |
| 0988628 | 1/1983 | U.S.S.R. ................. 280/81.6 |

OTHER PUBLICATIONS

"Bar Lock" Prior Art Drawing no date.
"Pin Lock" Prior Art Drawing no date.

*Primary Examiner*—Christopher P. Ellis
*Attorney, Agent, or Firm*—Myers, Liniak & Berenato

[57] ABSTRACT

A lockout mechanism for a self-steering axle suspension system is provided by using the internal fluid reservoir and piston of a shock absorber normally used to dampen oscillations of the wheels in such a suspension, by employing a selectively actuatable valve in the fluid flow path provided by an orifice in the piston of the shock absorber to prevent or modulate the flow of fluid across the piston thereby to lock out the steerability of the system to the extent desired.

27 Claims, 8 Drawing Sheets

SELF-STEERING SUSPENSION LOCKOUT MECHANISM

FIELD OF THE INVENTION

This invention relates to self-steering axle suspension systems for wheeled vehicles. More particularly, this invention relates to lockout mechanisms for preventing or controlling the steerability of such suspension systems.

BACKGROUND OF THE INVENTION

In recent years, self-steering axle suspension systems, particularly in the medium and heavy duty truck and semi-trailer industry, have become quite popular. Generally speaking, such suspensions are made self-steering by adjusting the pitch or caster angle of the wheels so that the drag of the wheels as the vehicle proceeds in the forward direction causes the suspension (i.e. the wheels of the system) to steer automatically in response to steering of the vehicle. Typical of such suspensions are those referred to as "pusher", "tag" or "trailing" axles found on trucks and semi-trailers. They may be of the liftable or non-liftable type.

In most self-steering suspensions in common use, a steering damper or pair of dampers is used to suppress (dampen) oscillations during road operation of the vehicle. While such dampers come in a wide variety of styles, one known type is similar in construction to a conventional shock absorber either with, or without, an external auxiliary coil spring. Such devices are often referred to as "stabilizers". In such a damper, a large cylinder is provided which houses a fluid reservoir that is almost completely filled with a hydraulic (i.e. incompressible) fluid. This cylinder is separated into two compartments by a piston having an orifice, or orifices, in its head, thus to form a flow path between the two compartments, but which otherwise seals the two compartments against fluid flow therebetween. Dampening is accomplished by attaching one end of the cylinder (usually by a piston rod connected to the piston head) to the steering mechanism of the suspension and the other end to the axle or beam structure of the suspension or vehicle (or vice versa). Since the orifice(s) in the piston head restricts flow between the two compartments as the piston slides in the cylinder due to oscillations experienced during vehicle operation (e.g. road shocks and wheel "shimmy"), such oscillations are appropriately dampened and tracking is stabilized.

In self-steering suspensions the castor angle, as aforesaid, is appropriately adjusted, in a conventional manner, to create steering during vehicle forward motion (e.g. as the vehicle goes into a turn). When the vehicle is backed up, however, the castor angle is no longer correct and the tires may tend to track improperly. In fact, the tires may actually tend to steer completely to one side or the other, at times quite abruptly. This, of course, is an undesirable occurrence, which may give rise to maneuverability difficulties or suspension damage.

Several technologies have been developed to address the aforesaid problem. The most common is to use some form of a mechanical linkage which locks out the steerability of the suspension (i.e. the wheels) when the vehicle is placed in its reverse operating mode. Two currently known systems in use are the so-called "bar lock" and "pin lock" systems.

In the "bar lock" system, a bar (or, more appropriately, a locking arm) is caused to swing into locking position by air actuation employing appropriate valving off of the brake chamber. When the locking arm swings into place, it engages an opening in the tie bar plate of the suspension's steering mechanism. Since this plate is attached to the tie rod of the steering mechanism and the arm is ultimately attached to the axle, steering is prevented. The "pin lock" is somewhat similar to the bar lock system in that it operates under the same principle, but uses an actuated pin instead of a bar. When an air cylinder is actuated, it forces a spring loaded pin to move down through an opening in the tie bar plate, thus rendering the steering mechanism inoperative.

The various lockout devices and techniques known prior to the subject invention have one or more drawbacks associated with their use. For the most part, they are usually difficult to install, are heavy and complex in the number of parts required to be added to the suspension as additional items, and often require considerable maintenance. Some have the potential for unreliable lockout engagement, and many require the use of added shock absorbers or dampers because they, themselves, have no capability in this regard.

In view of the above, it is apparent that there exists a need in the art for a lockout mechanism which is not subject to the above drawbacks in the prior art. It is a purpose of this invention to fulfill this need in the art, as well as other needs which will become more apparent to the skilled artisan once given the following disclosure.

SUMMARY OF INVENTION

Generally speaking, this invention fulfills the above-described needs in the art by providing a lockout mechanism for a self-steering suspension which for the first time, and in a unique way, employs the internal cavity, and parts, of what in the past has only been used as the aforesaid shock absorber-like damper for dampening out oscillations and reducing wheel "shimmy". By making certain rather simple modifications and additions to the piston rod and head of this known damper, a highly reliable, yet easily installed and relatively lightweight lockout mechanism is achieved.

In certain embodiments of this invention, therefore, there is provided a lockout mechanism for a self-steering, wheel-bearing axle suspension system of a vehicle, the suspension system including a wheel-bearing axle, steering means for steering the wheels of the system, and means for connecting the wheel-bearing axle and the steering means in ride engaging relationship to a frame member of the vehicle; the lockout mechanism comprising a cylinder connectable to the steering means, this cylinder having a walled fluid reservoir within it, a substantially incompressible fluid (e.g. liquid or gas) within the reservoir, a piston within the fluid reservoir having a piston head slidable within the reservoir and extending across the fluid reservoir in fluid-sealing engagement with the walls thereof so as to define a first fluid compartment and a second fluid compartment separated from the first fluid compartment by the piston head, the piston head having an orifice therein to thereby define a fluid flow path between the first and second fluid compartments; the lockout mechanism further including a valve associated with the piston head orifice for opening and closing the orifice to flow of the fluid between the first and second fluid compartments, and a control for actuating the valve to its open and closed positions; whereby when the orifice is substantially fully closed the lockout mechanism prevents any substantial steering of the wheels and when the orifice is open the wheels are steerable.

In certain further embodiments of this invention, the extent to which the valve of the lockout mechanism is open determines the degree of ease of steerability of the self-steering suspension. Controls are thus provided to accomplish a completely open, partially opened, or completely closed fluid flow path. In this way, when the flow path is completely closed the steering is effectively fully locked out because the fluid in the reservoir is not allowed to flow between the two fluid compartments. However, in certain other embodiments of this invention, sufficient fluid is allowed to flow, as by incomplete tolerance between the piston head seal and the wall of the reservoir, or by such inaccurate tolerance in the valve head, such that even in its most locked out or fully closed mode the cylinder is effective to act as a shock absorber-type damper to take up oscillations and prevent wheel "shimmy". In short, in such an arrangement the lockout mechanism acts as a damper regardless of the mode of actuation or deactuation in which it is placed. In still further embodiments, through the use of a pressure regulator, the amount of closing off of the flow path by the piston is modulated such that, for example, a high degree of lockout is effected if the vehicle makes a sudden lane change, but significant steerability is provided if the vehicle is in a long curve.

In still further embodiments the lockout mechanism is provided with one or two sensors. One sensor operates to sense when the vehicle is in its reverse gear (direction of travel) mode and activates lockout at that time. Another sensor operates to sense a predetermined forward travel speed (e.g. 45 mph) such that at or above this speed, lockout is actuated. Either one or both of these sensors may be employed.

This invention will now be described in relation to certain embodiments thereof as set forth in the accompanying illustrations, wherein:

DETAILED DESCRIPTION OF CERTAIN EMBODIMENTS

Before describing in detail the illustrated embodiments, it is to be pointed out that the term "lockout" as used herein is used in its conventional, but broad, sense. That is to say, the term "lockout" is used herein to mean that steerability has been, to some significant extent, made more difficult by effecting the lockout mode of the mechanisms of this invention. Thus "lockout" may be either partial or full.

When, for example, the amount of lockout effected is referred to as "full" or "fully closed" (with reference to the flow path), these terms are used to mean that no substantial steerability may occur in the otherwise steerable wheels of the suspension system involved. In some systems this may mean complete non-steerability and lockout against any substantial oscillatory movement. In most systems contemplated, however, these two terms are used to refer to a system wherein, while steerability by itself has been effectively eliminated, the system still acts as an effective shock absorber against oscillatory movements, including wheel "shimmy" during vehicle operation (e.g. through leakage across the valve as aforesaid).

Figure 1:
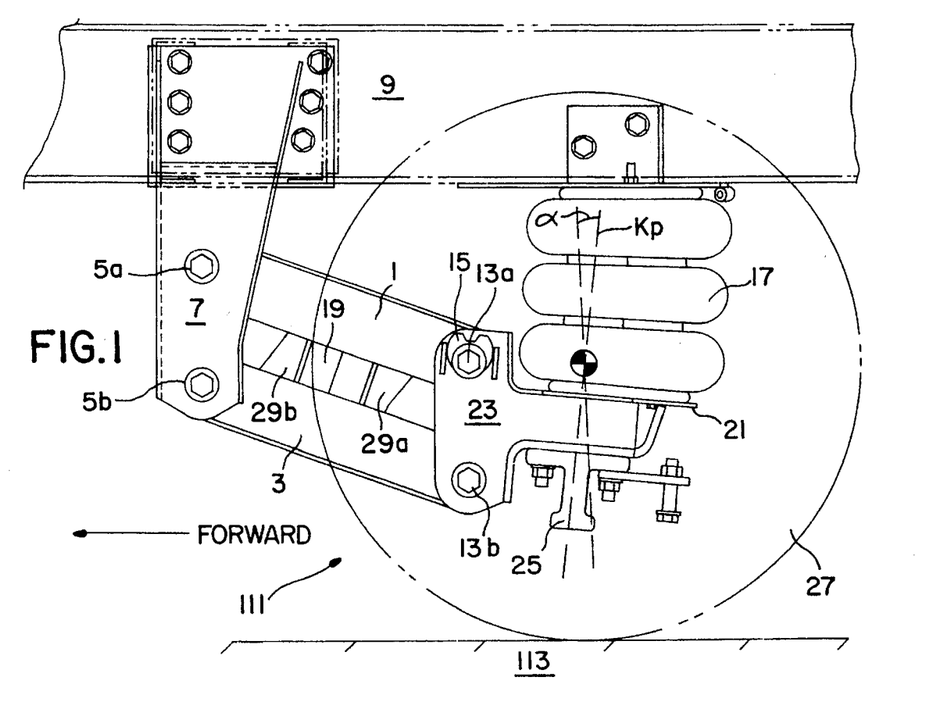
FIG. 1 is a partial side plan view of a known type of wheel-bearing steerable lift axle vehicle, but embodying a lockout mechanism according to the subject invention.
Figure 2:
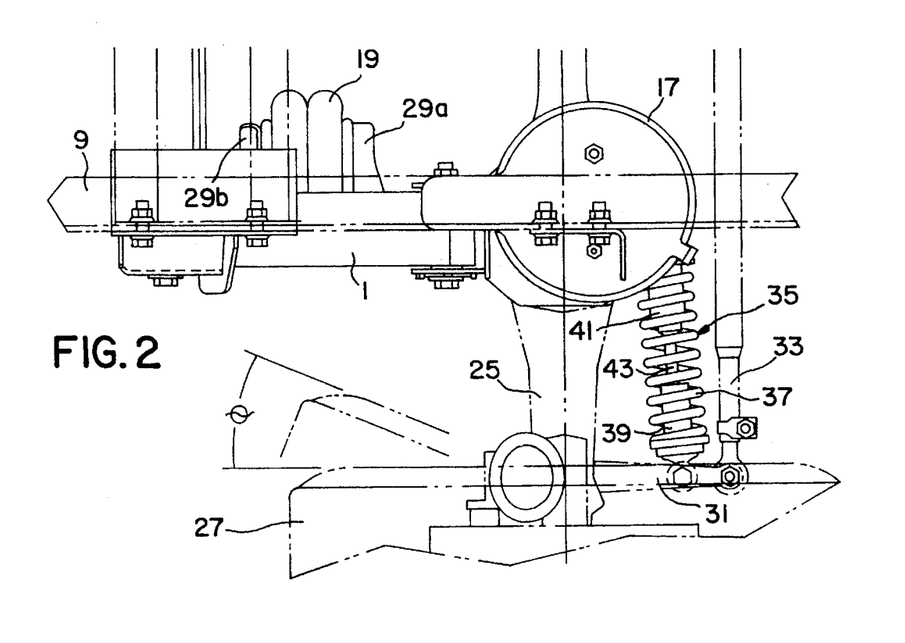
FIG. 2 is a top plan view of the embodiment of FIG. 1.

Reference is now made to FIGS. 1–2. In these Figures there is illustrated a lift axle suspension which finds particular utility as an environment in which the lockout mechanisms of this invention may be used. The suspension illustrated is an embodiment, in this respect, of the unique steerable, wheel-bearing lift axle suspension systems disclosed in our U.S. Pat. No. 5,403,031. The entire disclosure of this patent is incorporated herein by reference, including the discussion of the steerable nature of the suspension by adjustment of the caster angle so as to render the suspension self-steering. Also described therein is the nature of how the system is raised and lowered in accordance with the unique bi-directional expansion and contraction features of this patented system. Such features are prior art to the subject invention and serve as an advantageous environment in which the lockout mechanism of this invention may be efficiently and effectively employed.

By way of brief reference to this lift axle, illustrated in FIGS. 1–2, there is illustrated a pair of parallel beams 1, 3 pivotally connected at their forward ends by pivots 5a, 5b to hanger bracket 7 which, in turn, is bolted to longitudinal frame member 9 of vehicle 11. Parallel beams 1 and 3 are pivotally connected at their rearward ends to pivots 13a, 13b. Pivot 13a, of course, contains the mechanism as illustrated (and as fully described in the aforesaid U.S. Pat. No. 5,403,031) for adjusting the castor angle ∝ by turning eccentric cam 15 the requisite amount. (As illustrated "kp" is the king pin center line and the adjustable angle is usually about +3° to +6°.)

Figure 8A:
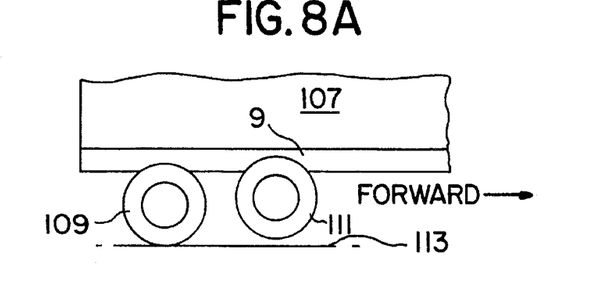
FIGS. 8a and 8b are side plan views of the lift axle embodiment of FIG. 1 in its "raised" and road-engaging or "lowered" positions, respectively.
Figure 8B:
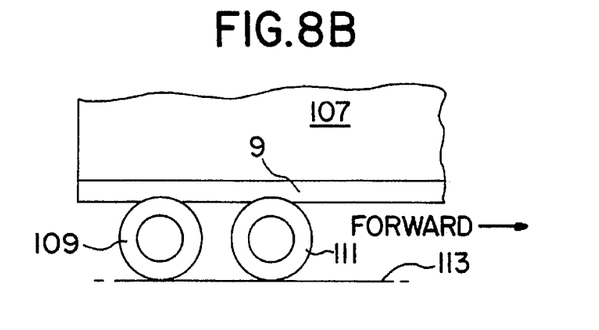

With reference next to FIGS. 8a, 8b a typical vehicle 11 is shown. Vehicle 11 has a body 107, a wheel-bearing, non-liftable, non-steerable suspension 109 as a primary means of support, and the wheel-bearing lift axle suspension of FIGS. 1, 2 generally designated as 111. The roadbed, or ground, is generally designated as 113. Vehicle 11, in this respect, may be any type of vehicle which employs a steerable, liftable or non-liftable axle suspension system. Examples include heavy duty dump trucks, semi-trailers, and the like.

FIGS. 1 and 8b illustrate suspension 111 in its "lowered" or "road-engaging" position. FIG. 8b, of course, shows suspension 111 in its "lifted" or "raised" position. As described and illustrated more fully in the aforesaid U.S. Pat. No. 5,403,031, raising and lowering of suspension 111 is accomplished by the expansion and contraction of air bellows 17 and 19, respectively. Bellows 17, in this respect, is connected at its upper end to frame 9 and at its lower end to pedestal 21 on axle seat member 23 which, in turn, is connected to axle 25. Axle 25, in turn, is connected to wheel (and tire) 27. It is understood, of course, that FIGS. 1–2 illustrate only one side of a typical vehicle and that the suspension in complete form is actually duplicated on the other side of the vehicle with axle 25 being a linking structure therebetween. Thus, by expanding bellows 17 and exhausting bi-directional bellows 19, wheels 27 are lowered into road engagement with ground surface 113. By expanding bi-directional bellows 17 (connected between brackets 29a, 29b attached to beams 1, 3 respectively, for bi-directional expansion) and exhausting bellows 17, wheels 27 are lifted from road engagement as shown in FIG. 8a. Air controls, using the brakes' air source, for accomplishing the lifting and lowering, are conventional and well known in the industry.

As aforesaid, suspension 111 is rendered steerable when in road engagement as illustrated in FIGS. 1–2 and 8b by appropriate adjustment of the caster axle, e.g. to a positive caster angle $\propto$ of about 3°–6°. Steerability is conventionally provided by a typical steering mechanism which includes a steering arm 31, and tie rod 33, which together with a conventional spindle arrangement (not shown) steerably connects the wheel to the axle. When such steerability is effected, there arises a need at times to provide a lockout mechanism for controlling steerability. As stated above, it was known prior to this invention to provide in this steering mechanism a simple stabilizer which, from all outward appearances, looked the same as lockout cylinder 35. Optionally, furthermore, such stabilizers were provided with a self-centering coil spring 37 of known construction. Prior to this invention, however, such stabilizers were merely used to dampen oscillations including wheel "shimmy" during vehicle operation. They had no substantial or significant retarding effect upon steerability. Thus if one, prior to our invention, desired a lockout feature in a steerable suspension, significant additional expense, time, weight, and installation costs had to be incurred to add a lockout mechanism which was separate from this stabilizer (e.g. the aforesaid "bar" or "pin" lockout mechanism).

It is, therefore, a unique feature and distinct advantage of this invention that full lockout may be provided on selective demand without the need for such an additional lockout mechanism. Rather, this invention achieves a portion of its uniqueness by using, through modification, the otherwise conventional inner structure of the conventional shock absorber-like stabilizers of the past to achieve the desired lockout features. In certain embodiments, in fact, it is contemplated that lockout is achieved while, at the same time, maintaining the dampening features of the known stabilizers even when the system has locked out steerability. In such embodiments the need to add an additional, separate lockout mechanism or stabilizer to the suspension is eliminated.

FIG. 2 (FIG. 1 being a side view thereof), in this respect, illustrates lockout cylinder 35 in a position either in straight ahead mode or as wheel 27 steers at an angle θ to go through a turn (partial wheel shown). As can be seen, the typical shock absorber-like structure of lockout cylinder 35 has expanded (during the turn) so as to separate dustcover 39 from reservoir housing 41, exposing piston rod 43. It is to be remembered, in this respect, that in the most usual embodiments, the system illustrated in FIGS. 1–2 is duplicated on the other side of the vehicle such that lockout cylinder 35 on that other side is facing in the opposite direction, thus to provide a mechanism which functionally handles both wheels equally as each turns according to the connecting linkage achieved by tie rod 33 and respective steering arms 31 on either side of the vehicle.

Figure 3:
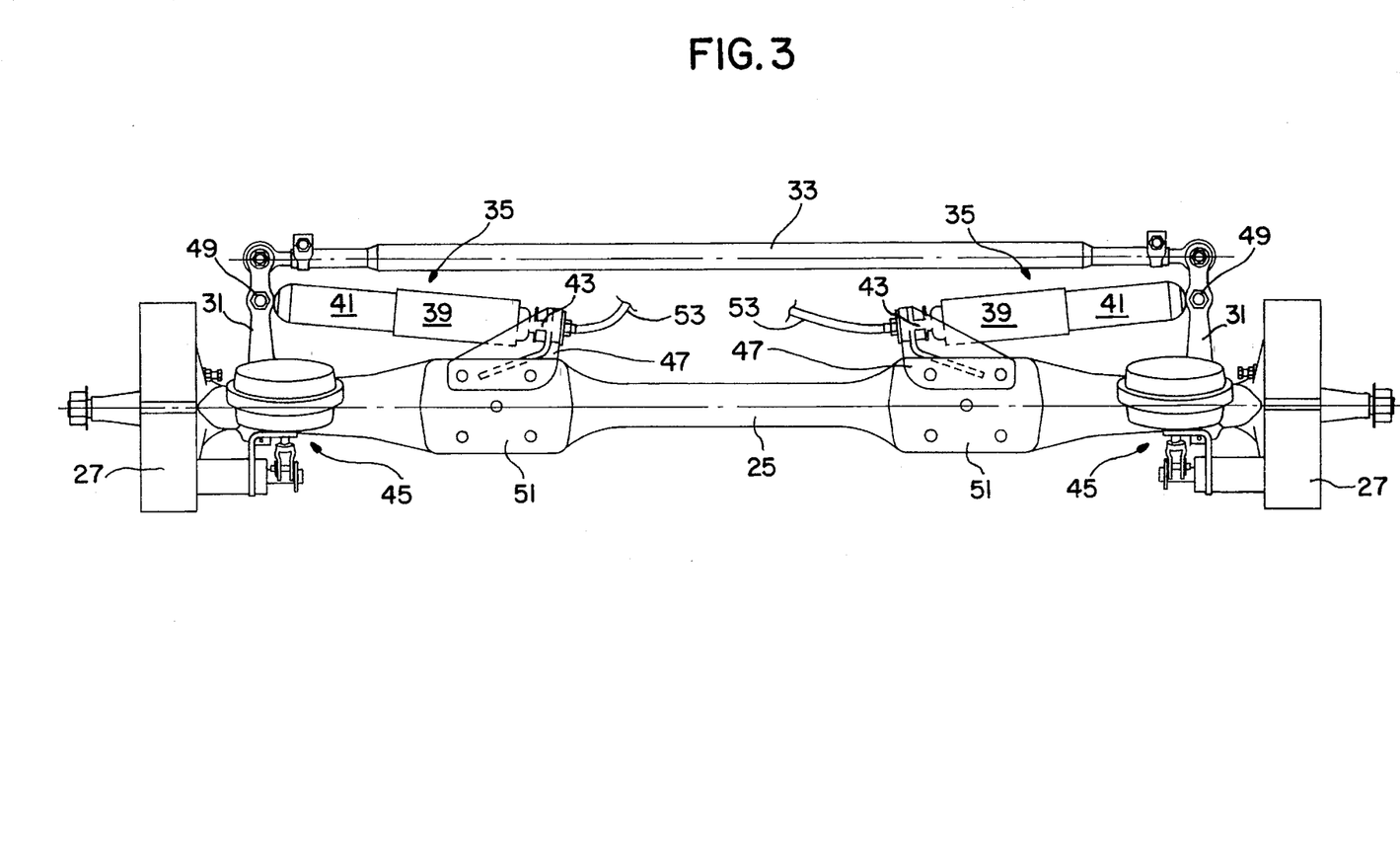
FIG. 3 is a top plan view of a known type of steerable axle, but incorporating therein an embodiment of a lockout mechanism according to this invention.

The nature of this steering linkage, as well as a manner of attachment of lockout cylinders 35 to the various other parts of the system, is best illustrated in FIG. 3. In this Figure, the tires have been removed from wheels 27 for better viewing of the system. Spring brakes 45 are, however, illustrated. As depicted, the end of piston rod 43 having cover 39 of lockout cylinder 35 is connected via brackets 47 to axle 25, while the opposite end of cylinder 35, namely, the reservoir end, is pivotally connected to steering arms 31 by pivot connections 49. In this way, lockout cylinders 35 are connected in opposite direction, one from the other, thereby to oppose each other functionally so as to appropriately handle oscillations and wheel shimmy, as well as steering in the two opposing wheels 27. Axle pads 51 are, of course, the locus for axle seat member 23 and air bellows 17. It is also to be stated that lockout cylinders 35 may be optionally provided with self-centering coil springs 37 if desired, as illustrated in FIG. 2.

As alluded to above, a skilled artisan viewing the embodiments of FIGS. 1–3 externally, would not normally be able to tell the difference between the prior art embodiments using non-lockout, shock absorber-like stabilizers and the subject invention, except for air lines 53 (see FIG. 3) that are connected to the end of each piston rod 43 (described more fully below). However, if that same skilled artisan were to disassemble what might normally be considered only a shock absorbing damper or stabilizer, the difference would become immediately apparent. This difference is best illustrated with reference to FIGS. 4–6 and 10.

Figure 4:
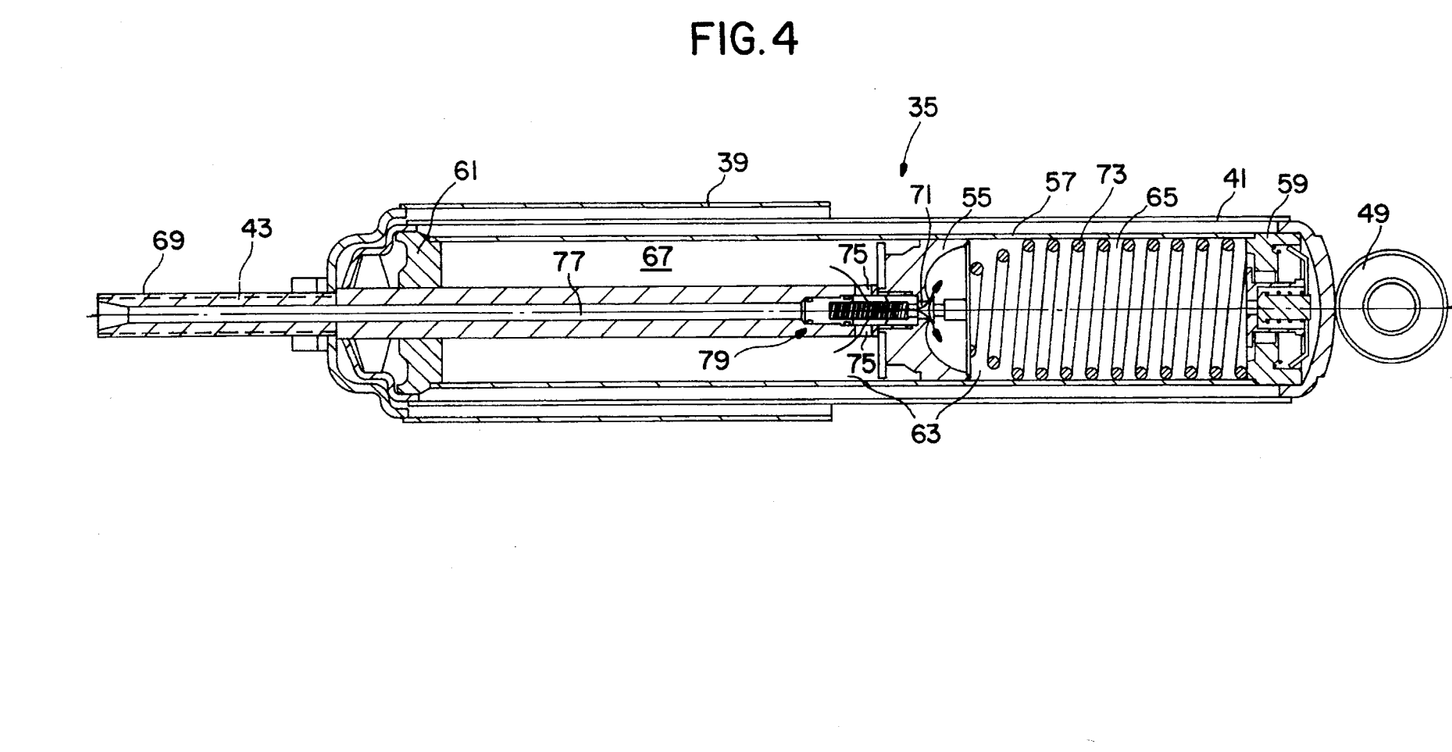
FIG. 4 is a side sectional view of an embodiment of a lockout cylinder according to this invention.

With reference first to FIG. 4, lockout cylinder 35 includes pivot connection 49, reservoir housing 41, dustcover 39 and piston rod 43. In conventional fashion dustcover 39 is connected to piston rod 43, so as to move therewith. Piston rod 43 is connected at one end to piston head 55. Piston head 55 extends across the internal cavity of reservoir housing 41 and sealingly, but slidingly, engages inner wall 57 of housing 41, which inner wall 57, together with end caps 59, 61, defines a fluid reservoir 63 therein. As thus constructed, piston head 55 separates reservoir 63 into a first fluid compartment 65 and a second fluid compartment 67. Since end 69 of piston rod 43 is connected to, for example, axle 25, while connection 49 is connected to steering arm 31 (or vice versa), the structure as shown provides a typical shock absorbing, stabilizer function due to the formation of a fluid flow path in piston head 55 such that first compartment 65 is in fluid flow communication with second compartment 67.

In this respect, reservoir 63 is generally substantially filled with a hydraulic (i.e. an incompressible) fluid However, other "fluids" i e defined herein broadly as liquids or gases, or combinations thereof, can be used if so desired. Thus by restricting the size of the flow path through an orifice(s) 71 in the piston head between compartments 65, 67 a damper is provided to control oscillation and wheel shimmy as piston head 55 slides within wall 57 due to oscillations that force fluid from one compartment to the other.

Now, for the first time, this invention modifies this internal, and otherwise conventional, structure so as to achieve a unique lockout mechanism. This is accomplished by the formation of at least one, and usually two or more, lateral orifice(s) 75 at the piston head end of piston rod 43 and an intersecting longitudinal orifice 77 extending centrally through the length of piston rod 43 which ultimately communicates with piston head orifice 71. In this way, a fluid flow path is formed between first fluid compartment 65 and second fluid compartment 67. Then, by the inclusion of an adjustable valve mechanism 79 at the interface of orifices 71, 75 and 77, a unique lockout mechanism is provided.

Figure 5:
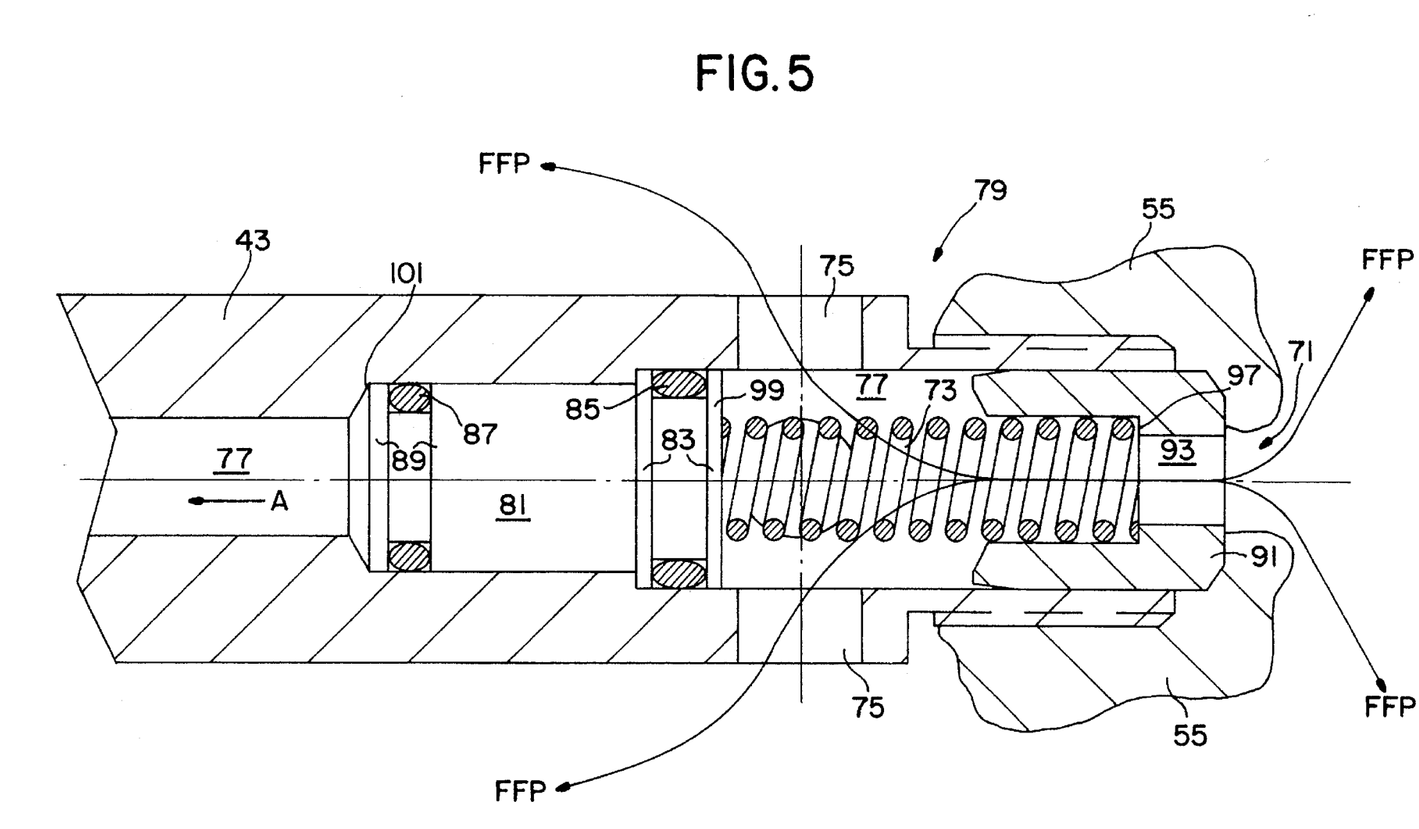
FIG. 5 is a partial side sectional view of the valve mechanism illustrated in FIG. 4 and further illustrating the flow path in its fully open position according to an embodiment of this invention.
Figure 6:
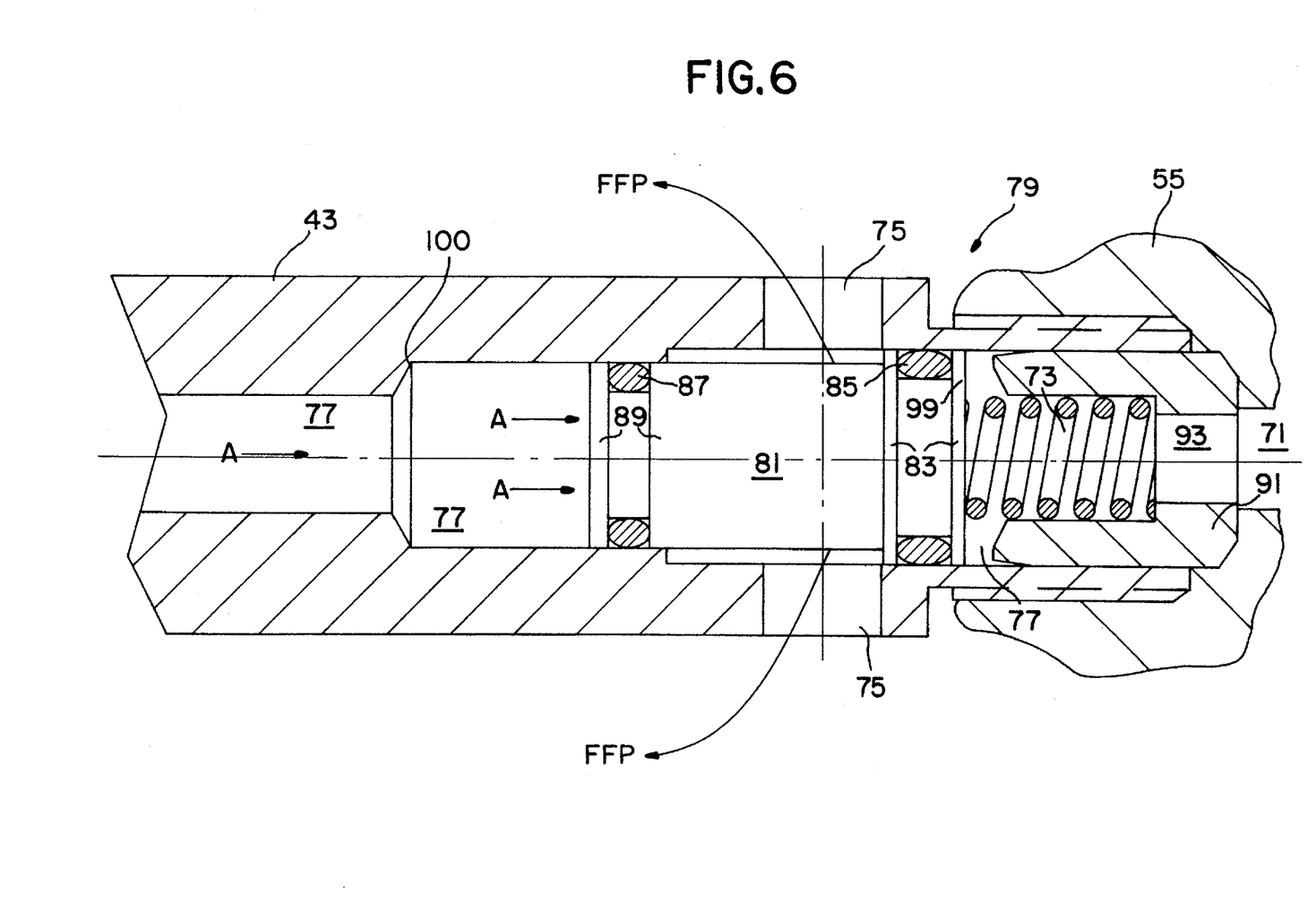
FIG. 6 is a partial side sectional view of the valve mechanism of FIG. 4, but illustrating the flow path in its fully closed position.

An embodiment of a valve mechanism 79 as contemplated herein and as illustrated in FIG. 4, is also illustrated in FIGS. 5–6. While the mechanism shown in these Figures is in the nature of a sliding spool valve, it is understood that various other types of valves may be used, such as a ball valve, to accomplish the same results. Such other types of valves are thus considered to be a "valve" within the meaning of this term as used herein and thus within the scope of our invention.

As illustrated, valve 79 is located at the intersection of piston head orifice 71, lateral piston rod orifice 75 and longitudinal piston rod orifice 77. Valve 79 includes a spool 81 provided with a pair of end lands 83 separated at their circumferential edges by a sealing O-ring 85. A further sealing O-ring 87 is provided at the other end of spool 81 similarly separating two land portions 89. Valve 79 further includes a spring retaining cap 91 which has a central orifice 93 aligned with piston head orifice 71. Spring retaining cap 91 is cup-shaped, so as to house in its internal cavity biasing coil spring 73.

Biasing coil spring 73 has a diameter and spring coil size which, together with the spacing between each contiguous coil, does not adversely affect the flow of fluid through orifices 75, 77, 93 an 71 (or vice versa). Such orifices, in this respect, define and form a fluid flow path FFP communicating first fluid compartment 65 with second fluid compartment 67 (FIG. 4). Coil spring 73 extends in compression between the internal end wall 97 of cap 91 and the end wall 99 of land 83 in this flow path as illustrated.

As shown in FIG. 5, coil spring 73 normally biases sliding spool 81 to a position where rear wall 99 clears orifice(s) 75 and thereby presents no obstruction to fluid as it flows through flow path FFP. This position may be referred to as the "fully open" position. In such a position valve 81 is inoperative for any lockout function and lockout cylinder 35 serves as a typical and effective damper (stabilizer) against articulation forces which cause oscillations and wheel shimmy without, at the same time, having any substantial effect upon the designed in steerability of the suspension.

As can be seen, O-rings 85 and 87 act to seal longitudinal orifice 77 from fluid communication across spool 81. This, in turn, enables the end of orifice 77 adjacent land 89 (as opposed to that portion of orifice 77 at the other end of spool 81 contiguous wall 99) to be used for air (or other fluid) actuation of spool 81 to a fully closed or partially open position. In FIG. 5 the arrow A indicates by direction the evacuation of air from orifice 77, thus allowing the normal bias of coil spring 73 to hold spool 81 against its rear stop wall 101 so as to be in its "fully open" position.

As shown in FIG. 6, when air or other fluid is applied at a sufficient pressure in orifice 77 at, and in the direction of, arrow A, spool 81 (including lands 83) is caused to move across the intersection of lateral orifice 75 and longitudinal orifice 77 impeding the flow of fluid through flow path FFP as it progresses. Obviously, in order for this to occur, sufficient force must be applied by the air in the direction of arrow A to overcome the bias of coil spring 73. Finally, if sufficient air pressure is applied, spool 81 will slide to the point illustrated in FIG. 6 where preferably both lands 83 (or only land 83 with wall 99 if so desired) clears orifice(s) 75. This position is aptly designated the "fully closed" position since, except for designed in or undesigned leakage across O-ring 85, no fluid can flow between first fluid compartment 65 and second fluid compartment 67. When this "fully closed" position is achieved, steerability of the suspension is fully locked out and dampening can take place only by way of the aforesaid designed or undesigned leakage in the valve itself (e.g. as by passage around O-rings 85). A further embodiment of this invention, wherein the air pressure is only sufficient to partially close orifice 75 will be described with respect to FIGS. 9–10 below.

By the above structure a valve is provided which defines three basic positions: (1) fully open, (2) partially open, and (3) fully closed. In the "fully open" position (FIG. 5), the suspension is free to steer to the full degree of its design as determined by the adjusted caster angle $\propto$. Only oscillations are dampened due to the nature of the flow path FFP which is significantly less than the diameter of fluid reservoir 63. In the "partially open" (i.e. "partially closed") position, sufficient interruption of fluid flow in flow path FFP is effected so as to reduce, i.e. lock out to some extent, the steerability of the suspension generally, in proportion to the amount of closing of flow path FFP effected (see FIG. 10 below). In the "fully closed" position (FIG. 6) steering, for all intents and purposes, is fully locked out. Then, by allowing, as aforesaid and optionally, for some designed in leakage, such as across lands 83 and O-ring 85 when valve 79 is "fully closed", a measure of dampening can be effected even though steering, for all intents and purposes, is fully locked out. Still further, or as yet another alternative, only one of the two cylinders 35 in the suspension (see FIG. 3) need be provided with this invention. The other may be a prior art damper. Still further, but less desirable, prior art dampers or shock absorbers may be provided in addition to the two valved lockout cylinders 35 of this invention. In whatever configuration chosen, by simple evacuation (e.g. release of the air pressure) in orifice 77 (in the direction of arrow A in FIG. 5), coil spring 73 automatically returns spool 81 to the fully open position shown in FIG. 5.

Figure 7:
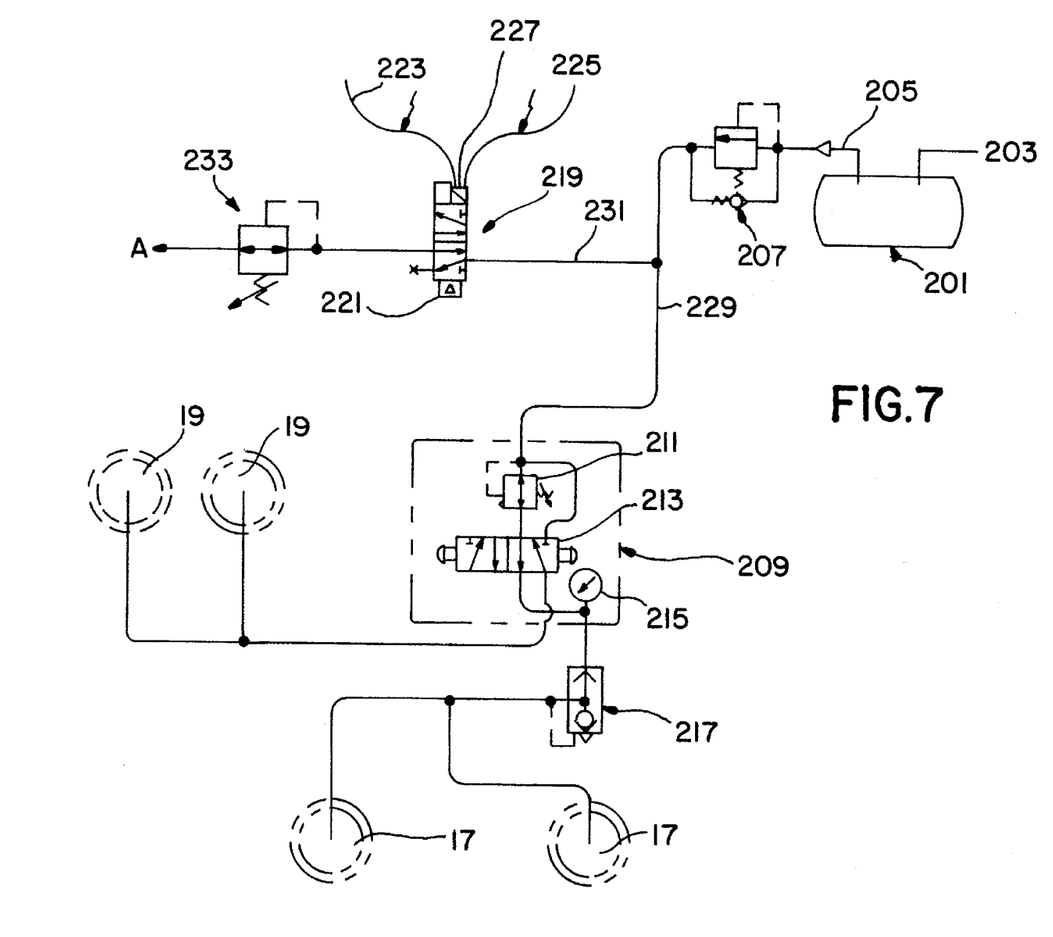
FIG. 7 is a schematic of an embodiment of a control mechanism according to this invention.

Various controls from simple to complex, depending upon the number of functions to be performed, may be designed to actuate valve 79. An exemplar embodiment is schematically illustrated in FIG. 7. Here, a control is provided with various options for sensing when the vehicle is placed either in a reverse (or any other pre-selected) gear mode and in response thereto locking out (fully or partially) the steering capability of the suspension and/or sensing when the vehicle has reached a speed at or above which lockout is desirable (e.g. 45 mph). In addition, and as illustrated, this same control has the capability of raising and lowering the lift axle. While this embodiment shows a combination of all three functions, it is understood that any selected control need have only one function. For example, in a non-liftable, steerable axle suspension, the lifting mode is not present and the control may employ either one or both of the sensors. An additional modulating option is also provided in FIG. 7, and will be discussed with respect to FIGS. 9–10 below.

With reference now to the particulars of FIG. 7, there is illustrated a conventional air reservoir 201 having an inlet 203 from a source of compressed air (e.g. the vehicle's air brake compressor, not shown for convenience). Exit line 205 from reservoir 201 leads to a conventional air brake protection valve schematically illustrated at 207. Typically, and in accordance with law in certain jurisdictions, brake protection valve 207 is provided so as not to allow air to be drawn off the brake system unless a minimum of 75 psi is achieved in reservoir 201.

A conventional air control kit is schematically illustrated at 209. This kit 209 includes pressure regulator 211, a manual two position valve 213, and pressure gauge 215. Kit 209 is used to regulate air to the air bellows in order to raise and lower the lift axle as aforementioned. For example, when valve 213 is in one position air is supplied to air ride bellows (springs) 17 and lift axle air bellows 19 are exhausted, thereby placing the suspension in its "lower" or "road engaging" position. In the other position, bellows 17 are exhausted and bellows 19 bi-directionally expand to lift wheels 27 out of road engagement to their "raised" position (as per our aforementioned patent). For convenience, a quick release valve 217 is provided for decreasing the time required to exhaust air from bellows 17 when wheels 27 are lifted.

The control governing the lockout features of this invention is generally illustrated at 219. As schematically illustrated, such a control conveniently includes an electronic solenoid valve 221 positioned as illustrated to be normally closed and to have a ground lead 223. At least one, and optionally two, sensor leads 225, 227 are further provided. Lead 225 may be connected to a conventional sensor for sensing the speed of the vehicle (e.g. from the electronics in the transmission), while lead 227 may be connected to sense when the vehicle is placed in its reverse gear mode, such as by a sensor connected to the reverse lights. In this manner, reverse travel and/or preselected highway speeds may be sensed, automatically, for lockout of the steerable wheels 27.

For example, in normal forward operation of a typical heavy duty truck or semi-trailer, air pressure (usually above 75 psi) is provided via line 229 from reservoir 201 through brake protection valve 207 to both air kit 209 and lockout control solenoid 221. Air kit 209 can then be used to both manipulate the lift axle and provide a constant air pressure to bellows 17 when the suspension is in its road engaging mode. Air provided via line 231 from line 229 to solenoid 221 is stopped because solenoid valve 221 is biased to be normally closed. When, then, a signal is received from either lead 225 or 227, the spool in valve 221 is shifted to open the output port of the valve and activate lockout. In this manner an effective lockout mechanism is achieved for both (or either) reverse travel and/or forward travel above a prescribed speed (e.g. 45 mph).

FIG. 7 further illustrates an additional and rather unique feature optionally incorporatable into the subject invention. First of all, it is clear from the above description that by modulating the air pressure applied to spool 81 in valve 79, the amount of steerability, or, in other words, the amount of retardation of the designed in steerability in the flow path FFP is regulatable simply by controlling the amount of closing of the flow path FFP. To effect such modulation, if desired, pressure regulator 233 may be provided. While such a regulator 233 may be very sophisticated, and even computer controlled, to yield varying degrees of pressure in response to varying load inputs, etc., on the lockout cylinders 35, regulator 233 may also effectively be a simple preset regulator (as illustrated), i.e. a regulator set to provide a simple, pre-selected single pressure to orifice 77 in piston rod 43.

Figure 10:
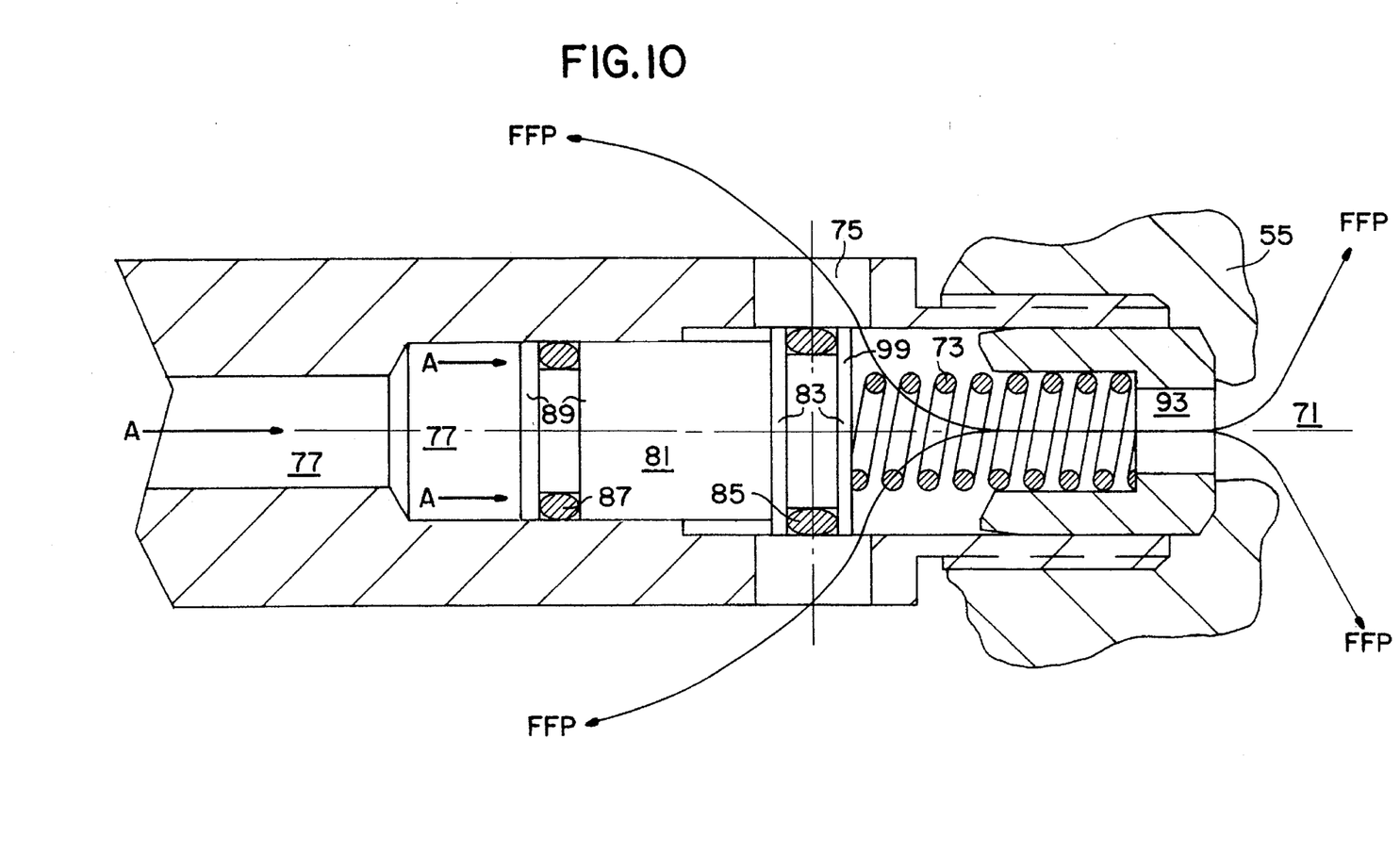
FIG. 10 is a partial side sectional view of the valve of FIGS. 4–6 in its partially open, modulated position as determined by preset established through the use of the curves of FIG. 9.

The choice of a preset pressure is well within the capabilities of a skilled artisan. Generally, it merely requires the balancing of the air pressure needed to achieve the desired degree of closure of flow path FFP by spool 81 against the biasing (opening force) of coil spring 73. FIG. 10 illustrates the positioning of end wall 99 when this balance is achieved thus achieving a "partially open" position. As can be seen, by providing a preset pressure from regulator 233 (via arrow A) to the rearward end of spool 81, the bias of coil spring 73 is sufficiently overcome so as to move land 99 across orifice 75 a preselected distance, thereby to significantly retard, but not to fully lock out, steering.

There are numerous instances where such an optional modulating feature may be desirable. For example, it is clear to the skilled artisan that in most instances it may be very important to fully lock out during reverse mode travel, but during forward travel some steerability should be left in the system (by modulation to a "partially open" position) so as to allow steering in long, slow curves even when the speed of the vehicle is above the selected maximum speed for locking out the steering. In such an instance, sensing in the reverse mode would by-pass regulator 233 (by-pass not shown for convenience), but sensing in the forward mode would send the air line pressure (e.g. 120 psi) in line 231 through the regulator which would lower the pressure to the desired amount (e.g. 50 psi) so as to present spool 81 in the partially open position shown in FIG. 10.

Figure 9:
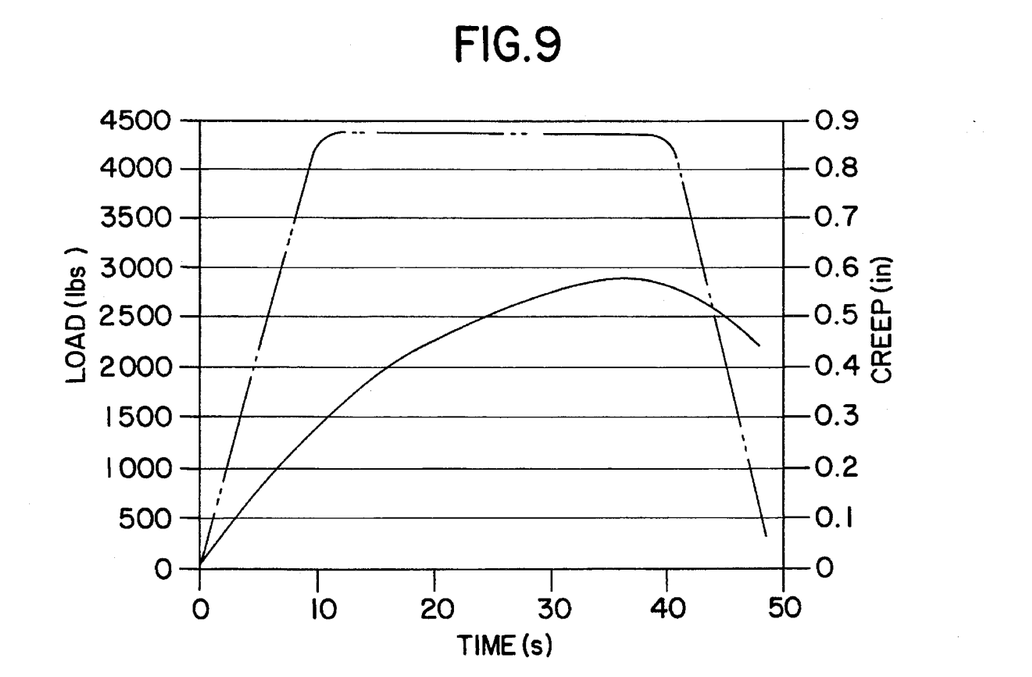
FIG. 9 is a graph illustrating a typical modulating preset curve for the embodiment of FIG. 1 if modulation is to be incorporated in the system.

One technique for choosing the appropriate pressure for regulation may be described with reference to FIG. 9. Such a technique includes instrumenting an exemplar vehicle with the particular model and size steerable axle desired, such that steer axle steering vs. time can be accurately monitored. Instrumentation adaptable for such use is well known to the skilled artisan and, of course, includes an adjustable regulator. The vehicle is then subjected to a series of high speed lane change maneuvers and long, sweeping curves in the highway. The regulator air pressure is then varied until the steering angle change during high speed lane change maneuvers is negligible, while, at the same pressure, the axle (wheels) tracks around the long, sweeping curves. The cylinders 35 on the axle are then removed and one of them is placed into a conventional press that monitors load vs. deflection. With the pressure regulator set at the same pressure that was used to optimize the performance characteristics on the highway, the cylinder is then subjected to a load and the deflection is monitored. As a guideline to the skilled artisan in how to carry out this invention, an exemplar load vs. deflection (creep) curve is set forth in FIG. 9 for a typical cylinder 35 found useful in lift axles for heavy duty trucks of the steerable lift axle type disclosed and illustrated in our aforesaid U.S. Pat. No. 5,403,031. In FIG. 9 the dotted line is load and the solid line is creep. From this exemplar, then, a preset pressure is determined which can then result, if desired, in the use of a simple preset, non-adjustable regulator for all similar types of vehicles and suspensions. From the curves the characteristics of cylinders 35 for similar further suspensions are thereby established, and clone cylinders selected accordingly.

In order to give the skilled artisan a further guideline for practicing this invention, rather than by way of limitation, a useful lockout cylinder 35 for use in a typical lift axle suspension, such as those disclosed and illustrated in our aforesaid U.S. Pat. No. 5,403,031, starts with a standard shock absorber such as made by Gabriel Corporation, Part No. 1TX695334, a well known 1 5/8" bore shock absorber. Such a shock has a cylinder with an O.D. for the dust collector of 3.25" and an O.D. for the reservoir of 2.75 inches. The reservoir holds 1018 cc of hydraulic fluid. The shock has an extended length of 23.66 inches, a collapsed length of 17.16 inches, and thus a stroke of 6.50 inches. This shock is then modified by providing a longitudinal orifice 77 of 0.30 inches in diameter, and 2 lateral orifices 75 of 0.30 inches in diameter. Outlet orifice 71 and cap orifice 93 are substantially the same and are 0.188 inches in diameter. The following comprises its performance characteristics when fully open:

|                     | Velocity (in/sec) |            |       |
| ------------------- | ----------------- | ---------- | ----- |
| Damping Force (LBF) | 4.71              | 13.35      | 26.70 |
| Rebound             | 720               | 950 ± 190  | 1212  |
| Compression         | 113               | 198 ± 50   | 254   |

Such a cylinder 35, now modified, is useful in the embodiment where reverse lockout and/or highway speed lockout is desired. Two such cylinders 35 may then be employed as cylinders 35 as shown in FIG. 3 and operated effectively by using the controls of FIG. 7 as described above.

Once given the above disclosure many other features, modifications and improvements will become apparent to the skilled artisan. Such other features, modifications and improvements are therefore considered to be a part of this invention, the scope of which is to be determined by the following claims:

We claim:

1. A lockout mechanism for a self-steering, wheel-bearing axle suspension system of a vehicle, said suspension system including a wheel-bearing axle, steering means for steering said wheels of said system and means for connecting said wheel-bearing axle and said steering means in ride engaging relationship to a frame member of said vehicle;

said lockout mechanism comprising a cylinder connectable to said steering means, said cylinder having a walled fluid reservoir therein, a substantially incompressible fluid within said reservoir, a piston within said fluid reservoir having a piston head slidable within said reservoir and extending across said fluid reservoir in fluid-sealing engagement with the walls thereof so as to define a first fluid compartment and a second fluid compartment separated from said first fluid compartment by said piston head, said piston head having an orifice therein thereby to define a fluid flow path between said first and second fluid compartments;

said lockout mechanism further including a valve associated with said piston head orifice for opening and closing said orifice to flow of said fluid between said first and second fluid compartments, and a control for actuating said valve to its open or closed position;

whereby when said orifice is substantially fully closed said lockout mechanism prevents any substantial steering of said wheels and when said orifice is open said wheels are steerable.

2. A lockout mechanism according to claim 1 wherein the ease of steerability of the wheels is in proportion to the extent to which said orifice is open.

3. A lockout mechanism according to claim 1 wherein said mechanism acts as a dampening device against wheel oscillation when said orifice is open, partially open, and closed.

4. A lockout mechanism according to claim 1 wherein said mechanism further includes a spring located in said first fluid compartment which normally biases said piston head toward said second fluid compartment.

5. A lockout mechanism according to claim 4 wherein said piston further includes a piston rod connected to said piston head extending outwardly through said second fluid compartment beyond one end of said cylinder, said piston rod having a longitudinal orifice therein connected to said control and a lateral orifice therein intersecting said longitudinal orifice, said lateral orifice being a part of said fluid flow path between said second fluid compartment, said piston head orifice, and said first fluid compartment, said valve for opening and closing said piston head orifice including a valve head movably located in said longitudinal orifice with respect to said lateral orifice so as to selectively interrupt or not interrupt fluid flow between said longitudinal and lateral orifice and so as to be movable into a position in said intersection between said longitudinal and lateral orifice thereby to close off said fluid flow path between said first and second fluid compartments and thereby prevent any substantial steering of said wheels.

6. A lockout mechanism according to claim 5 wherein said valve further includes a spring normally biasing said valve head to a position within said longitudinal orifice so as to not interrupt said fluid flow between said longitudinal and lateral orifice and thereby normally open said fluid flow path between said first and second compartments.

7. A lockout mechanism according to claim 6 wherein said control includes an actuator for selectively providing air to said longitudinal orifice under a pressure sufficient to overcome the bias of said spring normally biasing said valve head and to move said valve head to a position which closes said fluid flow path, and for selectively eliminating said air under pressure thereby to allow said normal bias of said spring to return said valve head to a position which re-opens said fluid flow path.

8. A lockout mechanism according to claim 7 wherein said actuator is capable of controlling said air pressure thereby to selectively move said valve head to a position which closes off said fluid flow path either partially or fully.

9. A lockout mechanism according to claim 1 wherein said lockout mechanism includes two said cylinders and a connection for connecting each said cylinder to an opposite side of said suspension.

10. A lockout mechanism according to claim 9 wherein said steering means of said vehicle includes a first and a second steering rod, each steering rod being located at a respective side of said vehicle and a tie rod extending between said first and second steering rods and connected in steering engagement with said rods, and wherein said lockout mechanism includes means for connecting a said cylinder to a respective said steering rod such that each said cylinder can be attached so as to be in an operatively opposing direction with respect to the other said cylinder.

11. A lockout mechanism according to claim 10 wherein said lockout mechanism further includes means for connecting each said cylinder to said axle.

12. A lockout mechanism according to claim 1 wherein said lockout mechanism includes a sensor for sensing when said vehicle is in a reverse gear mode and an actuator for actuating said valve to a closed position in response to said sensor sensing that the vehicle is in said reverse gear mode.

13. A lockout mechanism according to claim 1 wherein said lockout mechanism includes a sensor for sensing when said vehicle reaches a predetermined speed and an actuator for actuating said valve to a closed position when said vehicle is operated at or above said predetermined speed and for actuating said valve to an open position when said vehicle is operated below said predetermined speed.

14. A lockout mechanism according to claim 13 wherein said lockout mechanism further includes a sensor for sensing when said vehicle is in a reverse gear mode and an actuator for actuating said valve to a closed position in response to said sensor sensing the vehicle being placed in said reverse gear mode.

15. A lockout mechanism according to claim 14 wherein said vehicle includes reverse gear backup light electric circuitry and said sensor for sensing said reverse gear mode includes a connection for connecting said sensor to said backup light electric circuitry.

16. A lockout mechanism according to claim 15 wherein said vehicle includes an electronic transmission circuitry capable of indicating the speed of travel of said vehicle and said sensor for sensing said predetermined speed of said vehicle includes a connection for connecting said sensor to said electronic transmission circuitry.

17. A lockout mechanism according to claim 1 wherein said control is capable of actuating said valve to a closed position when said wheels are in a turned position.

18. A lockout mechanism according to claim 1 wherein said mechanism further includes a sensor for sensing load inputs to said vehicle above a predetermined speed, and in accordance with the amount of said load input incurred, actuating said control so as to vary the amount of closing of said valve in proportion to the said load input sensed.

19. A lockout mechanism for a self-steering, wheel-bearing axle suspension system of a vehicle comprised of a wheel-bearing axle, steering means, and a shock absorber having a fluid flow path therein for stabilizing oscillations in said system when in motion, said lockout mechanism including a valve located in the fluid flow path within said shock absorber for interrupting fluid flow in said fluid flow path thereby locking out said steering means.

20. A lockout mechanism according to claim 19 wherein said shock absorber includes a cylinder portion having therein a fluid reservoir and a piston head so located in said cylinder so as to define on either side of said piston head a fluid compartment, said piston head having an orifice therein to define a normally shock absorbing fluid flow path between said fluid compartments, said means located within said shock absorber for locking out said steering means includes means for selectively opening and closing said shock absorbing fluid flow path between said fluid compartments.

21. A lockout mechanism according to claim 20 wherein said lockout mechanism further includes sensor means for sensing when said vehicle is in a reverse driving mode and actuator means responsive to said sensor means for actuating said lockout mechanism to a position closing said fluid flow path when said sensor means senses said vehicle in said reverse driving mode.

22. In a frame-membered wheeled vehicle having a wheel-bearing axle suspension system connected to the frame member of said vehicle, said system including a wheel-bearing axle, self-steering means for steering said wheels of said system, means for connecting said system to said frame member of said vehicle and a lockout mechanism for preventing said steering means from steering said wheels at selected times, the improvement comprising wherein said lockout mechanism includes a cylinder connected to said steering means, said cylinder having a walled fluid reservoir therein, a fluid in said reservoir, a piston within said fluid reservoir having a piston head slidable within said reservoir and extending across said fluid reservoir in fluid-sealing engagement with the walls thereof so as to define on either side of said piston head a respective first fluid compartment and a second fluid compartment, said piston head having an orifice so as to establish a fluid flow path between said first and second fluid compartments;

said lockout mechanism further including a valve means associated with said orifice for opening and closing said orifice to flow of said fluid between said first and second fluid compartments, and a control means for actuating said valve means to its open and closed positions;

whereby when said orifice is fully closed said lockout mechanism prevents any substantial steering of said wheels and when said orifice is open said wheels are steerable.

23. In the frame-membered wheeled vehicle according to claim 22 wherein said lockout mechanism is effective as a shock absorber against wheel oscillation in whatever mode of actuation or deactuation the lockout mechanism is placed.

24. In the frame-membered wheeled vehicle according to claim 22 wherein said vehicle includes a transmission having a reverse gear mode, and wherein said lockout mechanism includes sensor means for sensing when said transmission is in a reverse gear mode, and wherein said control means includes means for actuating said valve means to a closed position in response to said sensor means sensing said vehicle in a said reverse gear mode.

25. In the frame-membered wheeled vehicle according to claim 22 wherein said vehicle includes a means for indicating the speed of said vehicle in the forward direction and wherein said lockout mechanism includes sensor means connected to said speed indicator means for actuating said valve means to a closed position in response to said sensor means sensing a speed above a predetermined amount.

26. In the frame-membered wheeled vehicle according to claim 25 wherein said vehicle includes a transmission having a reverse gear mode and wherein said lockout mechanism includes sensor means for sensing when said transmission is in a reverse gear mode, and wherein said control means includes means for actuating said valve means to a closed position in response to said sensor means sensing said vehicle in said reverse gear mode.

27. In the frame-membered wheeled vehicle according to claim 24 or 25 wherein said lockout mechanism is effective as a shock absorber against wheel oscillation in whatever mode of actuation or deactuation the lockout mechanism is placed.

* * * * *